Patented Apr. 26, 1938

2,115,355

UNITED STATES PATENT OFFICE 2,115,355

BLENDED OILS

Peter J. Wiezevich, Elizabeth, N. J., now by judicial change of name to Peter J. Gaylor, assignor to Standard Oil Development Company, a corporation of Delaware No Drawing. Application April 7, 1934, Serial No. 719,604

6 Claims. (Cl. 87—9)

This invention relates to improved high boiling oil compositions and more specifically to nonsludging oils for lubricating and insulating oils.

Mineral, animal, vegetable, and other similar oils are desirable materials for lubrication, insulation, and other uses, because of their superior viscosity characteristics, their availability, and their low price. However, they possess the disadvantage in many cases of becoming susceptible to oxidation, which often leads to the formation of high acidity, emulsification, and sludging, especially during use over long periods of time. It is the object of this invention to overcome, prevent, or even eliminate these and other detrimental properties by blending with the oil a condensed aromatic compound prepared according to the process disclosed herein. Unfortunately, these aromatic compounds possess such poor viscosity-temperature relationships, that their use in the relatively pure state is limited to only a few cases. Hence this invention deals with oil blends containing from 0.05% to 10%, or 20%, although in some cases as much as 50% or more of such condensed aromatic compounds may be employed to obtain the desired results. They also raise the autoignition temperature of oils, making them very desirable for use in locations in which explosions are imminent.

The term "condensed aromatic compound" includes aromatic substances which have been increased in molecular weight by condensation as by polymerization, voltolization, either by dehydrogenation, dehydration or the like, or by condensation with other substantially non-paraffinic compounds, and the like. In his "Theoretical Organic Chemistry" (MacMillan & Co., 1918) Cohen defines "condensation" as follows: "It generally implies the union of two or more molecules of the same or different substances, and sometimes of parts of the same molecule, usually, though not invariably, with the elimination of water, alcohol, or hydrochloric acid." The fundamental idea is that the new combination is stable in character and the product cannot be broken up into its original constituents. The phrase "substantially non-paraffinic" refers to cyclic, heterocyclic, alkylated aromatic or even low molecular weight aliphatic compounds, and specifically excludes long chain, waxy-paraffinic materials such as those mentioned in U. S. Patent 1,815,022. For example, materials produced by subjecting diphenyl oxide to high temperature over relatively long periods of time, such as those materials prepared according to the process disclosed in U. S. Patent 1,905,850 have been found especially suitable for this purpose. In this patent diphenyl oxide is subjected to a temperature of about 400° C. or higher with or without the use of a catalyst, and a highly aromatic oil is obtained having the following approximate properties:

| | |
|---|---|
| Specific gravity | 1.12–1.21 at 25° C. |
| Viscosity at 210° F. | 40–70 sec. Saybolt |
| Pour | 50° F. |
| Refractive index @ 25° C. | 1.654 |
| Carbon | 87.12% |
| Hydrogen | 5.49% |
| Oxygen | 7.34 |

The product may be purified if desired, prior to adding it to a mineral oil. The polymerized substances termed "C" and "D" in the article by Grebe and Holsen, Mech. Eng. 55, 369 (1933) prepared by a similar process have been found highly suitable as sludge dispersing agents. These compounds appear to prevent the coagulation of sludge particles during or after their formation, so that the usual sludge troubles are not encountered. A sample of such treated and decolorized material had the following viscosity characteristics:

| | Seconds Saybolt |
|---|---|
| Vis./100° F. | 705 |
| Vis./210° F. | 42.6 |

It will be noted that its viscosity index, as described by Dean and Davis in Chemical and Metallurgical Engineering 36, 618 (1929) is considerably below 0. That is, the viscosity of this material is subject to considerable change during temperature variations. When it is blended with a relatively high V. I. oil, this effect is not as pronounced, and especially is such the case when only a fraction or even a few percent are employed mainly to disperse sludge. Higher amounts, say 10–20% or more of this material also tend to lower the oxidation rate of the oil.

The Sligh test, as described in Proc. A. S. T. M. 24, 964, II, (1924) is a means for measuring the sludge formation of an oil. Samples of mineral oils of S. A. E. 50 and 20 grades were subjected to a modified form of the above test, and the results obtained with and without the polymerized material prepared according to the above patent are given below:

Sample—

| | Sligh Number |
|---|---|
| Mineral oil S. A. E. 50 | 4.7 |
| Mineral oil S. A. E. 50+1% polymerized material | 0.7 |
| Mineral oil S. A. E. 20 | 30 |
| Mineral oil S. A. E. 20+1% polymerized material | 18 |

It can be readily seen that the polymerized material is a very effective sludge dispersing agent.

Other products which are suitable for this purpose are condensed petroleum fractions, e. g. condensed recycle cracking coil stock, condensed cracking coil tar, condensed solvent extracts, such as those obtained from petroleum fractions or crudes by means of extraction with phenol, sulfur dioxide, propane, nitrobenzene, dichlorethyl ether, furfural, and the like or combinations of these. It is possible to first oxidize such materials with air or a similar reagent, and then to condense or polymerize the products by heating at high temperature with or without catalysts such as vanadium or tungstic oxide, aluminum chloride, alumina, copper oxide, cuprous chloride, clay, or the like.

As stated previously, relatively pure aromatic compounds or mixtures of such compounds may also be condensed to produce the blending agents desired. It is preferable, however, to employ as starting materials aromatics having boiling points above 400° F. although compounds of lower boiling points are not specifically excluded. For instance, benzene, naphthalene, chlorinated naphthalene, diphenyl, halogenated diphenyl, diphenyl or diphenylene oxide, alkylated aromatic hydrocarbons, phenols and alkylated phenols, phenol esters or salts, aromatic esters, ethers, or acids, coal tar fractions, and the like may be used as raw materials.

These aromatic compounds may be condensed to such a high molecular weight that only a few percent are sufficient to raise the viscosity of the oil by 10, 50, 300 or even 1000 or more seconds Saybolt at 100° F. Such highly condensed products, generally averaging from 200 to 1000 or 5000 or more molecular weight, have the ability of lowering the viscosity index of a mineral and/or vegetable oil blend. Mineral oil blends of this type, especially those containing oxidation inhibitors, preferably of the substantially non-polar type (e. g. hexaphenylethane, gossypol, mineral oil extracts, alpha naphthol, and the like) have been found highly suitable as cable oils. For example, the following composition is applicable for such use:

|  | Percent |
| --- | --- |
| White oil (vis./100° F. 224 secs. Saybolt vis./210° F. 46.3 secs.) | 98 |
| Condensed diphenyl oxide (M. W. 350) | 1.9 |
| Gossypol | 0.1 |

Other products such as turbine oils, automobile engine lubricants, aeroplane lubricants, transformer oils, greases, and other similar materials may be prepared from suitable blends of mineral oils and/or glyceride oils containing the condensed aromatic compounds discussed herein. The latter also may be added to fuels, such as gasoline, fuel oil, diesel oil, solvents, naphthas, and the like, to improve their properties.

The condensed aromatics so formed may be employed in blends in conjunction with pour inhibitors, linear polymer thickeners, metallic soaps, dyes, oiliness improvers, extreme pressure lubricating agents, oxidation and polymerization inhibitors, and similar blending materials.

As base stocks, various mineral oils such as Pennsylvania, Coastal, Mid-Continent stocks, and mineral oils having viscosity indices above 50, treated, extracted, or hydrogenated oils, white oils, shale, wood, or coal tar oils, oils obtained by the hydrogenation of lignite, coal, tars, etc. and other similar oils may be used. Likewise, other suitable stocks, as for example synthetic oils, ester lubricants, glyceride oils such as castor oil, rapeseed oil, lard oil, fish oils, or their hydrogenated or polymerized products are likewise satisfactory. Mixtures or combinations of these materials can be employed for this purpose.

This invention is not limited to any specific examples or theories on the mechanism of the action of the blending agents, but only to the following claims which have been drawn up as broadly as the prior art permits.

I claim:

1. An oil containing a condensed oxygen-containing aromatic material containing more than two nuclei per molecule and capable of reducing the Sligh value of an oil.

2. An oil containing 0.05 to 50% of a substantially non-dyeing condensed oxygen-containing aromatic material containing more than two nuclei per molecule capable of dispersing sludge.

3. An oil according to claim 2 in which the condensed aromatic material is normally a liquid.

4. A lubricant comprising a mineral oil and 0.05 to 10% of condensed diphenyl oxide containing more than two nuclei per molecule.

5. A turbine oil comprising a mineral oil and a condensed substantially non-dyeing oxygen-containing aromatic product containing more than two nuclei per molecule.

6. A lubricant comprising a mineral oil, a thickened vegetable oil, and a condensed oxygen-containing aromatic compound containing more than two nuclei per molecule.

PETER J. WIEZEVICH.